United States Patent
Kuroki et al.

(10) Patent No.: US 11,199,262 B2
(45) Date of Patent: Dec. 14, 2021

(54) SEGMENT SEAL

(71) Applicant: Eagle Industry Co., Ltd., Tokyo (JP)

(72) Inventors: Yasuhiro Kuroki, Tokyo (JP); Toru Kono, Tokyo (JP); Akira Urabe, Tokyo (JP)

(73) Assignee: EAGLE INDUSTRY CO., LTD.

( * ) Notice: Subject to any disclaimer, the term of this patent is extended or adjusted under 35 U.S.C. 154(b) by 147 days.

(21) Appl. No.: 16/631,773

(22) PCT Filed: Aug. 2, 2018

(86) PCT No.: PCT/JP2018/029013
§ 371 (c)(1),
(2) Date: Jan. 16, 2020

(87) PCT Pub. No.: WO2019/031377
PCT Pub. Date: Feb. 14, 2019

(65) Prior Publication Data
US 2020/0208742 A1 Jul. 2, 2020

(30) Foreign Application Priority Data
Aug. 7, 2017 (JP) .............................. JP2017-152793

(51) Int. Cl.
*F16J 15/44* (2006.01)
*F16J 15/30* (2006.01)

(52) U.S. Cl.
CPC .............. *F16J 15/30* (2013.01); *F16J 15/44* (2013.01)

(58) Field of Classification Search
CPC .. F16J 15/30; F16J 15/44; F16J 15/441; F16J 15/442
See application file for complete search history.

(56) References Cited

U.S. PATENT DOCUMENTS

| 9,194,424 | B2 * | 11/2015 | Garrison | ............. F16C 32/0625 |
| 9,316,316 | B2 | 4/2016 | Kuroki | ..................... F16J 15/30 |

(Continued)

FOREIGN PATENT DOCUMENTS

| EP | 1 777 376 | 4/2007 | ............. F01D 25/18 |
| EP | 2 986 832 | 11/2017 | ................ F02C 7/28 |

(Continued)

OTHER PUBLICATIONS

English Translation of International Preliminary Report on Patentability issued in application No. PCT/JP2018/029013, dated Feb. 20, 2020 (6 pgs).

(Continued)

*Primary Examiner* — Gilbert Y Lee
(74) *Attorney, Agent, or Firm* — Hayes Soloway P.C.

(57) ABSTRACT

A segment seal is configured to seal an annular clearance between a housing and a rotary shaft in a state in which a pair of seal rings are attached in an unrotatable state between one end portion of the housing and a support member attached to the housing so as to be opposite to the one end portion in an axial direction. The segment seal includes an anti-rotation member placed not to rotate relative to the housing or the support member, provided with a pair of raised portions fitted to the pair of seal rings to prevent rotation of the pair of seal rings, and configured such that at least one of the raised portions has a shape fittable only to either one of the seal rings.

11 Claims, 7 Drawing Sheets

(56) References Cited

U.S. PATENT DOCUMENTS

| | | | |
|---|---|---|---|
| 2007/0085278 A1* | 4/2007 | Davis | F01D 25/183 |
| | | | 277/411 |
| 2015/0049968 A1* | 2/2015 | Garrison | F01D 11/04 |
| | | | 384/115 |
| 2016/0010483 A1* | 1/2016 | Miller | F16J 15/30 |
| | | | 277/543 |
| 2017/0335970 A1* | 11/2017 | Manry | F16J 15/442 |
| 2019/0017547 A1* | 1/2019 | Garrison | F16C 32/0625 |
| 2020/0248816 A1* | 8/2020 | Haynes | F16J 15/26 |
| 2021/0033194 A1* | 2/2021 | Manry | F16J 15/3256 |

FOREIGN PATENT DOCUMENTS

| | | | |
|---|---|---|---|
| JP | H0178772 | 5/1989 | F16J 15/16 |
| JP | H11108197 | 4/1999 | F16J 15/30 |
| JP | 2006336850 | 12/2006 | B60K 17/344 |
| JP | 2008163984 | 7/2008 | F16J 15/24 |
| WO | WO2014103446 | 7/2014 | F16J 15/24 |

OTHER PUBLICATIONS

International Search Report and Written Opinion (w/translations) issued in application No. PCT/JP2018/029013, dated Nov. 6, 2018 (10 pgs).

Extended European Search Report issued in EP Patent Appln. Serial No. 18844593.6-1015, dated Mar. 15, 2021, 7 pages.

* cited by examiner (b)

(b)

(b)

(a)

(b)

SEGMENT SEAL

TECHNICAL FIELD

The present invention relates to a segment seal applied to, e.g., high-speed rotary equipment such as a vehicle or an industrial machine and configured to seal an annular clearance between a housing and a rotary shaft.

BACKGROUND ART

In a segment seal applied to high-speed rotary equipment such as a vehicle or an industrial machine and configured to seal an annular clearance between a housing and a rotary shaft, it is, as disclosed in Patent Citation 1, configured such that sealing target fluid is guided into a pressure balance groove (i.e., a dynamic pressure groove) provided at an inner peripheral surface of a seal ring to generate dynamic pressure (i.e., positive pressure) between the inner peripheral surface of the seal ring and a peripheral surface of the rotary shaft and pressure balance between an outer peripheral surface side and an inner peripheral surface side in the seal ring is achieved even when the pressure of the sealing target fluid increases. The inner peripheral surface of the seal ring is held in non-contact with the rotary shaft, and abrasion of the seal ring due to high-speed rotation of the rotary shaft is reduced.

As the segment seal, a tandem segment seal configured such that seal rings are arranged in an axial direction of a rotary shaft and sealing target fluid is sealed in multiple stages from atmosphere on a machine outer side to enhance sealability has been known. For example, a tandem segment seal applied to a rotary shaft seal device (e.g., high-speed rotary equipment) as disclosed in Patent Citation 2 mainly includes a packing case hermetically attached to a shaft hole inner peripheral surface of a housing, a pair of seal rings coupled in a state in which the positions thereof are determined in a circumferential direction by a positioning pin and having the same shape, and a pressing plate biased in the axial direction by a side spring in the packing case to press and hold the pair of seal rings in the packing case. A locking pin (or a key) extending from the packing case is inserted into a recessed portion formed at the pressing plate, and accordingly, the pair of seal rings pressed and held by the pressing plate in the packing case is locked relative to the packing case. Thus, the sealing target fluid can be sealed in the multiple stages between an inner peripheral surface of each of the seal rings and a peripheral surface of a rotary shaft.

CITATION LIST

Patent Literature

Patent Citation 1: International Publication No. 2014/103446 (page 6, FIG. 9)
Patent Citation 2: Microfilm of Japanese Utility Model Application No. 62-174237 (Japanese Utility Model Publication No. 1-78772) (page 7, FIG. 1)

SUMMARY OF INVENTION

Technical Problem

In order to enhance the sealability while reducing abrasion of the seal ring due to high-speed rotation of the rotary shaft in the segment seal applied to the high-speed rotary equipment, the pair of seal rings provided with the dynamic pressure grooves, such as Rayleigh steps, for providing dynamic pressure action by one-directional rotation at the inner peripheral surfaces may be arranged in the axial direction of the rotary shaft for providing the dynamic pressure action, thereby forming the tandem segment seal. However, it is configured such that the pair of seal rings is locked relative to the housing by fitting of the key and the recessed portion, and for this reason, there is a probability that arrangement of the pair of seal rings is switched in the axial direction in the segment seal due to an error in attachment of the seal rings. If it so happened, each seal ring is attached in a state inverted 180 degrees in the axial direction. For this reason, the inner peripheral surface of each seal ring receives reverse rotation of the rotary shaft to generate negative pressure between the inner peripheral surface of the seal ring and the peripheral surface of the rotary shaft, and accordingly, the seal ring sticks to the rotary shaft. Thus, there is a problem that damage of the seal ring is caused within a short period of time.

The present invention has been made in view of such a problem, and an object of the present invention is to provide a segment seal configured so that an error in attachment of a pair of seal rings in a tandem segment seal can be prevented.

Solution to Problem

For solving the above-described problem, the segment seal of the present invention is a segment seal for sealing an annular clearance between a housing and a rotary shaft in a state in which a pair of seal rings is attached in an unrotatable state between one end portion of the housing and a support member attached to the housing so as to be opposite to the one of end portion in an axial direction, the segment seal comprising an anti-rotation member placed not to rotate relative to the housing or the support member, provided with a pair of raised portions or a pair of recessed portions fitted to the pair of seal rings to prevent rotation of the pair of seal rings, respectively, and configured such that at least one of the raised portions or at least one of the recessed portions has a shape fittable only to either one of the seal rings.

According to this feature, at least one of the raised portions or at least one of the recessed portions of the anti-rotation member for preventing rotation of the pair of seal rings is fittable only to either one of the seal rings, and therefore, the direction of attachment of the pair of seal rings to the anti-rotation member is defined. Thus, in a state in which the order of inserting the seal rings inserted into one end side and a support member side, respectively, of the housing is wrong, fitting of the seal ring and the anti-rotation member cannot be made. Thus, an error in attachment of the pair of seal rings in the tandem segment seal can be prevented. Moreover, even when a dynamic pressure groove for providing dynamic pressure action by one-direction rotation of the rotary shaft is, as a preferable form, formed at an inner peripheral surface of the seal ring, the error in attachment of the pair of seal rings can be prevented. Thus, generation of negative pressure between the inner peripheral surface of the seal ring and a peripheral surface of the rotary shaft due to receiving of reverse rotation of the rotary shaft can be prevented.

Preferably, the anti-rotation member is interposed between the pair of seal rings, and comprises an annular plate and a pair of keys protruding from both surfaces of the annular plate and having different shapes, the housing is provided with a keyway having one of the keys fitted therein, and the keyway of the housing has a shape fittable only to either one of the keys of the anti-rotation member.

With this configuration, the anti-rotation member is interposed between the seal rings, the keyway of the housing has a shape fittable only to either one of the keys protruding from both surfaces of the annular plate, i.e., only to the key on one side of the front and back sides in the axial direction. Thus, in a state in which the direction of attachment of the anti-rotation member to the housing is wrong, fitting of the key of the anti-rotation member on a side of the support member in the axial direction to the keyway of the housing cannot be made, and therefore, an error in attachment of the anti-rotation member to the housing and an error in attachment of the seal rings to the anti-rotation member can be prevented. Thus, an error in attachment of the pair of seal rings to the housing can be prevented, and the error in attachment of the pair of seal rings in the tandem segment seal can be prevented.

Preferably, each of the raised portions is formed by part of each of the keys.

With this configuration, the raised portions of the anti-rotation member fitted in, for example, the pair of recessed portions of the seal rings are part of the keys protruding from both surfaces of the annular plate and having the different shapes. Thus, position adjustment in a case that the key of the anti-rotation member protruding to one side of the front and back sides in the axial direction is fitted in the recessed portion of the seal ring and the keyway of the housing, is easily performed. Therefore, workability in attachment can be enhanced.

Preferably, the keys are arranged with the same phase in a circumferential direction on both surfaces of the annular plate.

With this configuration, the keys are arranged with the same phase in the circumferential direction on both surfaces of the annular plate, and therefore, fitting of the keys of the anti-rotation member and the recessed portions of the pair of seal rings can be easily made without position adjustment in the circumferential direction. Thus, the workability in attachment can be enhanced.

Preferably, one of the key on a side of the one end portion of the housing is smaller than one of the key on a side of the support member.

With this configuration, the key of the anti-rotation member on the one end portion side of the housing is smaller than the other key on the support member side, and therefore, only the key of the anti-rotation member protruding toward the one end portion of the housing is fittable in the keyway of the housing. The error in attachment of the anti-rotation member is avoided, and the error in attachment of the pair of seal rings in the tandem segment seal can be reliably prevented.

Preferably, the support member has a keyway in which one of the keys of the anti-rotation member protruding toward the support member is fitted.

With this configuration, the keyway in which one of the keys protruding to the support member side of the housing is fitted is provided at the support member attached to the housing after insertion of the pair of seal rings. Thus, the keys of the anti-rotation member protruding toward the support member for preventing rotation of the support-member-side seal ring relative to the housing can be shared to prevent rotation of the support member. Thus, a structure of the segment seal can be simplified.

DESCRIPTION OF EMBODIMENTS

The mode for carrying out a segment seal according to the present invention will be described below with reference to embodiments.

First Embodiment

A segment seal according to a first embodiment of the present invention will be described with reference to FIGS. 1 to 6. Hereinafter, the left side in the plane of paper of FIG. 1 will be described as a machine inner side of high-speed rotary equipment to which the segment seal is applied, and the right side in the plane of paper of FIG. 1 will be described as a machine outer side.

Figure 1:
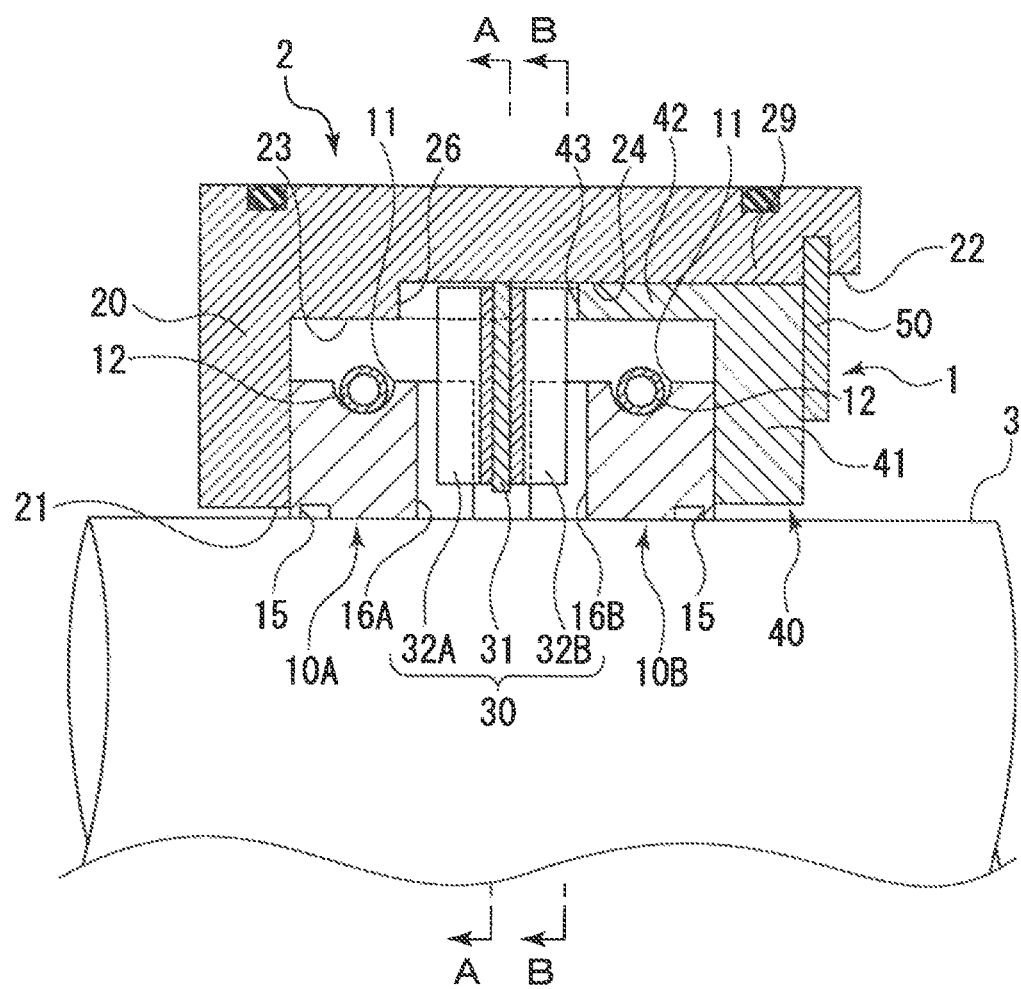
FIG. 1 illustrates an attachment state of a segment seal according to a first embodiment of the present invention, and is a sectional view cut toward a shaft center along a plane including keyways.
Figure 2:
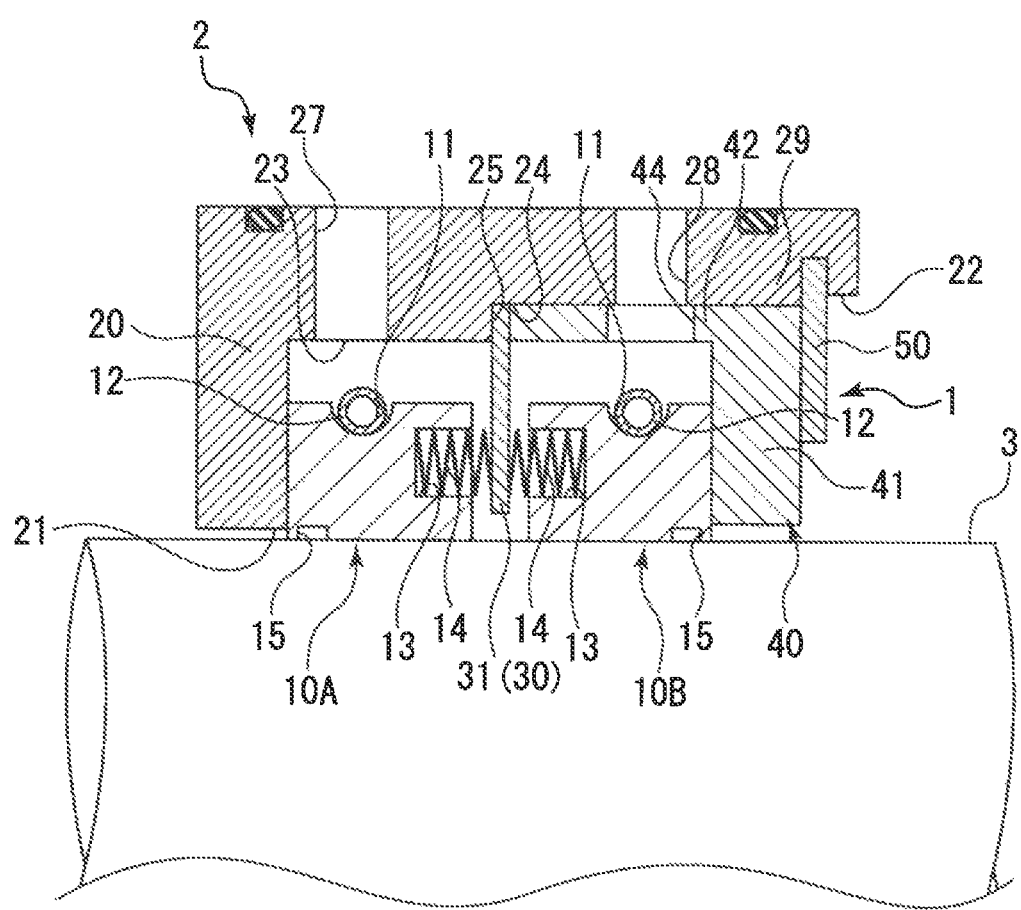
FIG. 2 illustrates the attachment state of the segment seal in the first embodiment of the present invention, and is a sectional view cut toward the shaft center along a plane including fluid supply holes.
Figure 3:
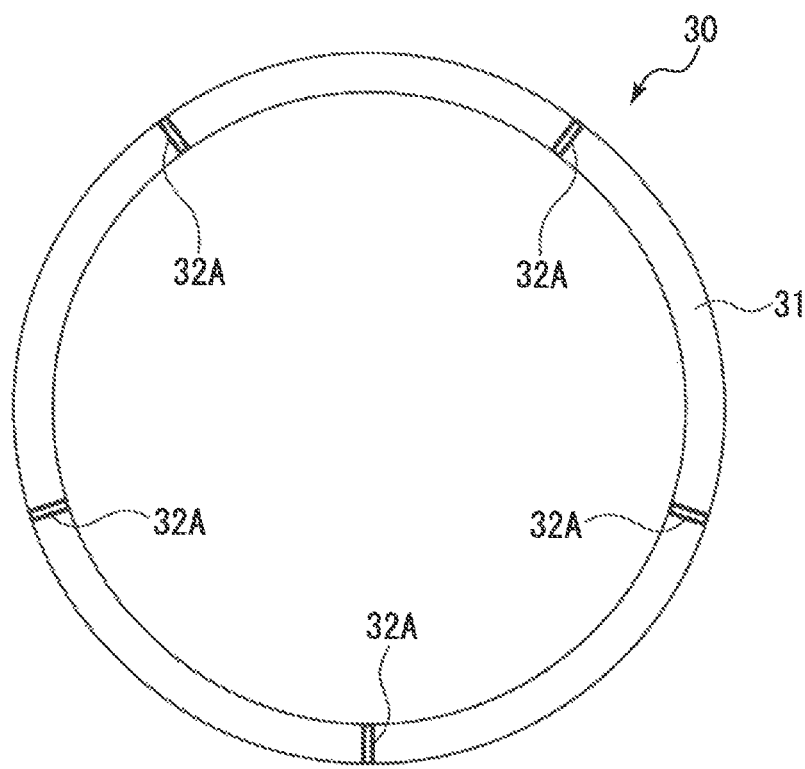
FIG. 3A is a front view of a structure of an anti-rotation member of the first embodiment of the present invention from a machine inner side.
FIG. 3B is a front view of the structure of the anti-rotation member from a machine outer side.
Figure 3:
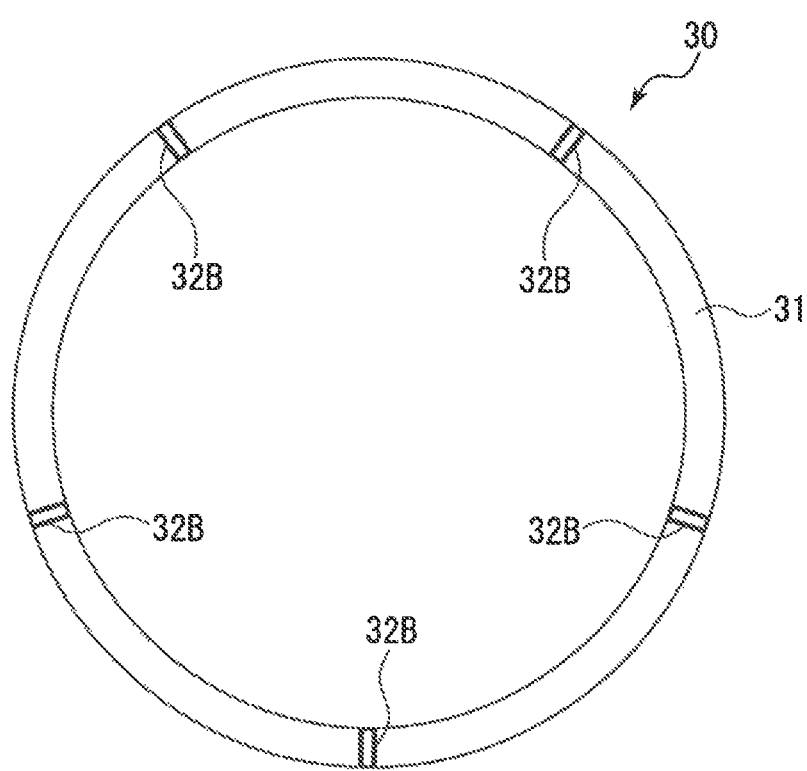
Figure 4:
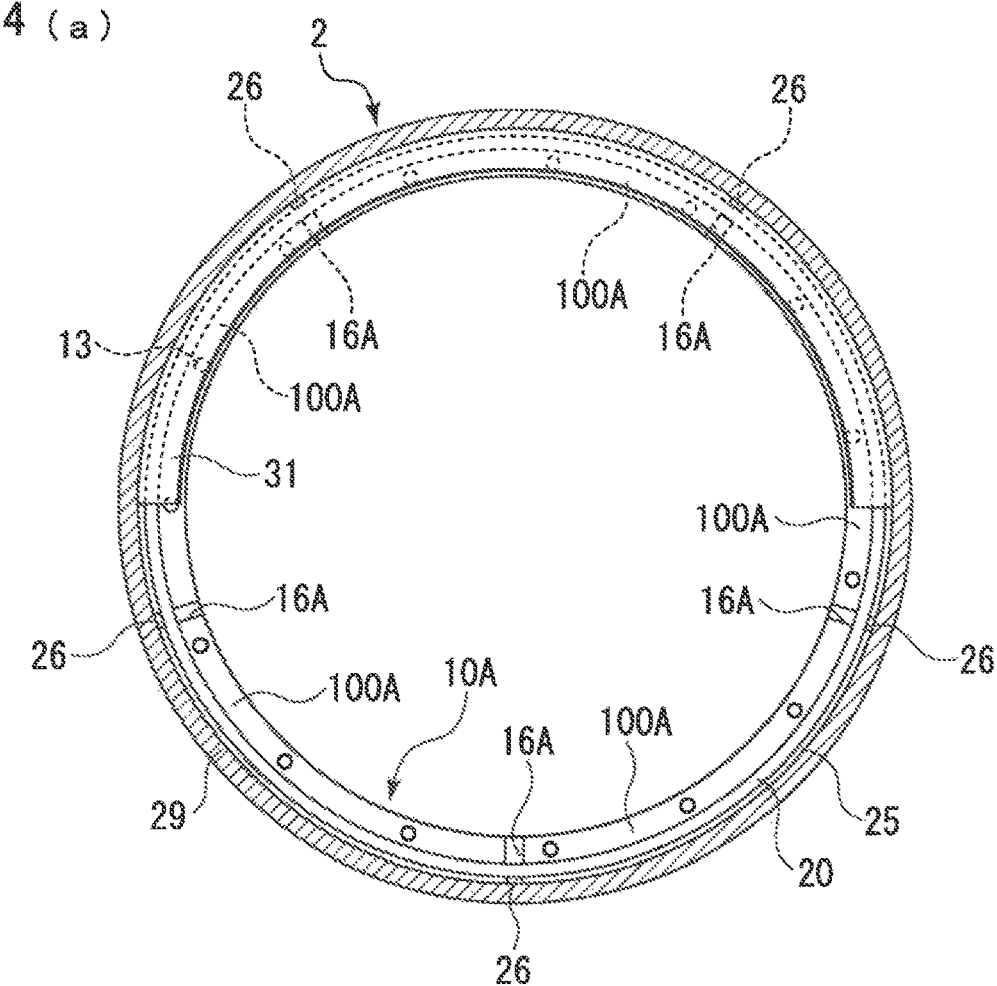
FIG. 4A is a sectional view of a structure of high-speed rotary equipment to which the segment seal of the first embodiment of the present invention is applied in an AA section of FIG. 1.
FIG. 4B is a sectional view of a fitting state of a key of the anti-rotation member and keyways of a machine-inner-side seal ring and a housing in the first embodiment of the present invention.
Figure 4:
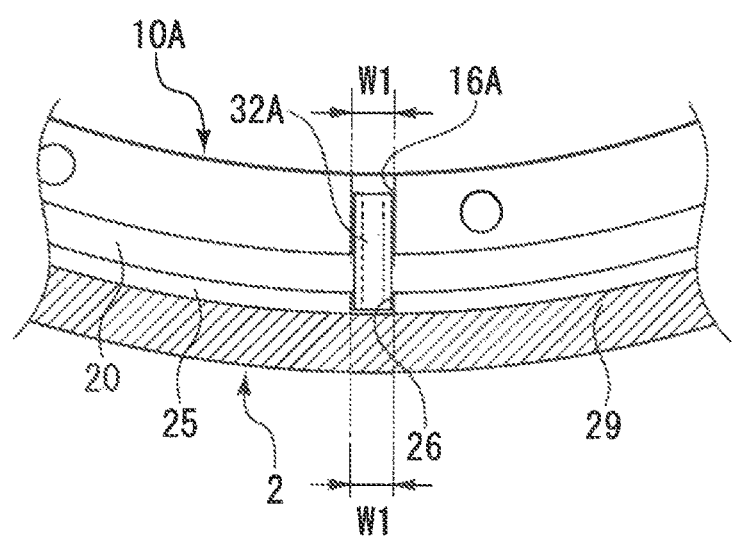
Figure 5:
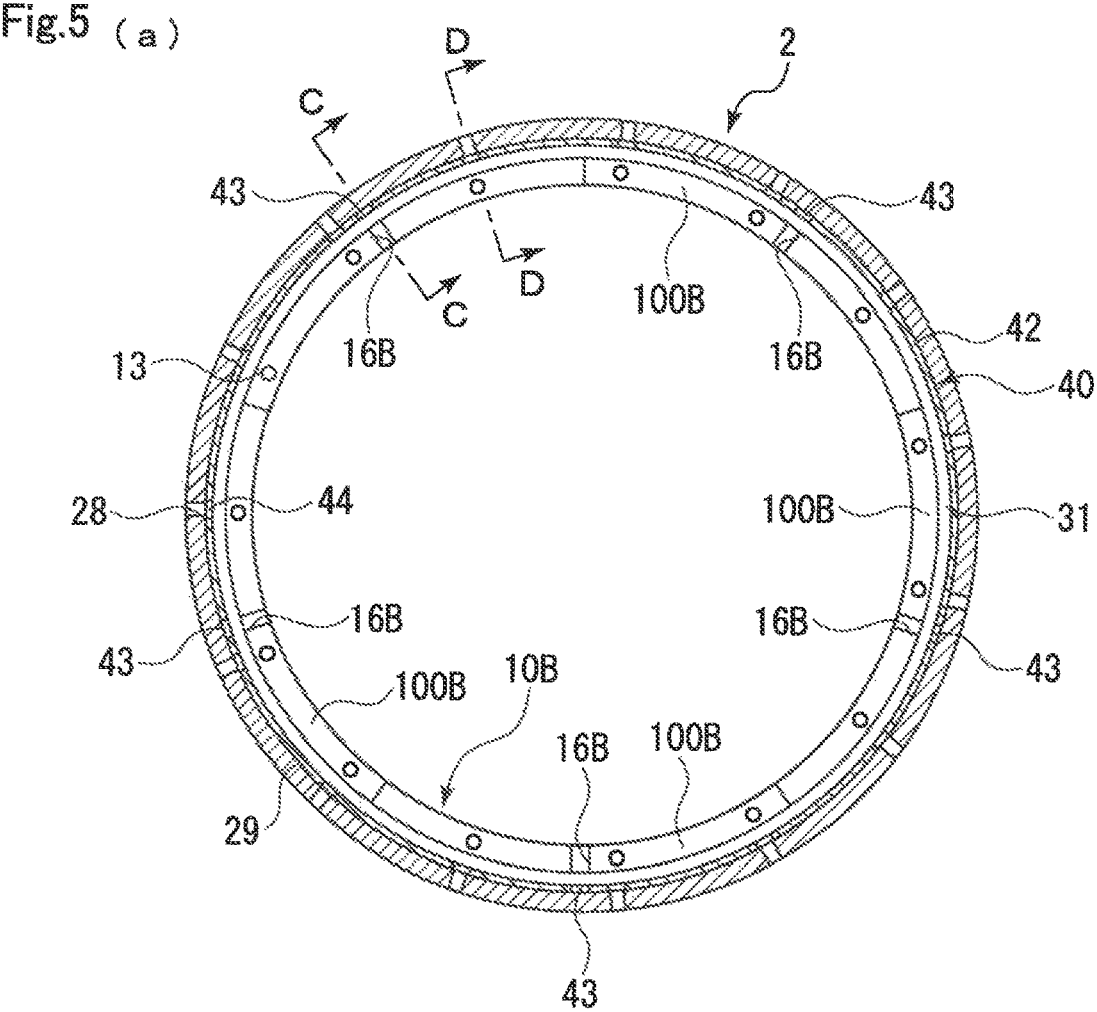
FIG. 5A is a sectional view of the structure of the high-speed rotary equipment to which the segment seal of the first embodiment of the present invention is applied in a BB section of FIG. 1.
FIG. 5B is a sectional view of a fitting state of the key of the anti-rotation member and keyways of a machine-outer-side seal ring and a back plate in the first embodiment of the present invention.
Figure 5:
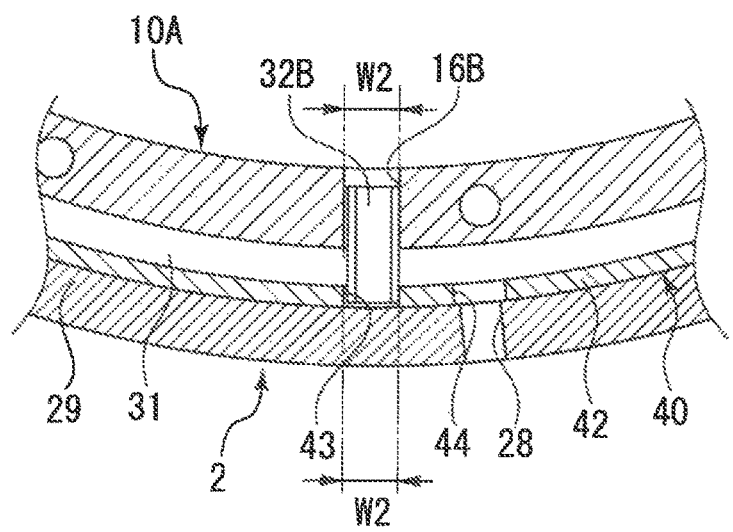

As illustrated in FIGS. 1 and 2, the segment seal 1 of the first embodiment is, for example, applied to the high-speed rotary equipment such as a jet engine of an aircraft, and is attached for sealing an annular clearance between a housing 2 and a rotary shaft 3 inserted into a shaft hole 21 provided at the housing 2 and made of metal such as stainless steel.

Moreover, the segment seal 1 of the first embodiment is configured as a so-called tandem segment seal configured such that a pair of seal rings 10A, 10B is arranged in an axial direction in the annular clearance between the housing 2 and the rotary shaft 3. Note that regarding the pair of seal rings 10A, 10B forming the segment seal 1, one arranged on the machine inner side will be described as the seal ring 10A, and one arranged on the machine outer side will be described as the seal ring 10B.

Further, for the sake of convenience in description, FIG. 1 illustrates a section (corresponding to a CC section of FIGS. 5A and 5B) cut toward a shaft center along a plane including later-described keyways 26 of the housing 2, and FIG. 2 illustrates a section (corresponding to a DD section of FIGS. 5A and 5B) cut toward the shaft center along a plane including later-described first fluid supply holes 27 and later-described second fluid supply holes 28 of the housing 2. Moreover, for a member formed in an annular shape, part of an end surface is not shown in the figure.

First, a structure of the housing 2 will be specifically described. As illustrated in FIGS. 1 and 2, the housing 2 is formed in a substantially L-shape as viewed in the section such that an annular restriction portion 20 (i.e., one end portion) extends toward an inner diameter side from a machine-inner-side end portion of a cylindrical portion 29 provided with a first annular recessed portion 23 and a second annular recessed portion 24 for housing the segment seal 1 inserted through a machine-outer-side opening 22, and the shaft hole 21 for insertion of the rotary shaft 3 is provided at the annular restriction portion 20. Moreover, a seal groove is provided on an outer diameter side of the housing 2 and having a seal member such as an O-ring housed therein for preventing leakage from an attachment target member such as a housing of the not-shown high-speed rotary equipment attached to the outer diameter side of the housing 2. Note that at the cylindrical portion 29 of the housing 2, the first annular recessed portion 23 provided on the machine inner side is configured to have a smaller diameter than that of the second annular recessed portion 24 provided on the machine outer side. At an inner peripheral surface of the cylindrical portion 29, an annular step portion 25 (see FIG. 2) is formed due to a diameter dimension difference between the first annular recessed portion 23 and the second annular recessed portion 24.

The annular step portion 25 is provided with five keyways 26 (see FIG. 4A) arranged at equal intervals in a circumferential direction. The keyway 26 is formed in such a manner that an inner peripheral surface side of the cylindrical portion 29 of the housing 2 is cut out in a substantially rectangular shape from the annular step portion 25 to the first annular recessed portion 23, and opens to the inner diameter side and the machine outer side in the housing 2. Note that an upper half in FIG. 4A illustrates a section cut along a section in which a machine-outer-side surface of a plate 31 forming an anti-rotation member 30 is viewed in an AA section of FIG. 1, and for the sake of convenience in description, a lower half in FIG. 4A illustrates a section in a state in which machine-inner-side keys 32A forming the anti-rotation member 30 are omitted in the AA section of FIG. 1.

As illustrated in FIG. 2, first fluid supply holes 27, the number of which is fifteen, and second fluid supply holes 28, the number of which is fifteen, penetrating the cylindrical portion 29 in a radial direction to communicate with the first annular recessed portion 23 and the second annular recessed portion 24 and arranged at equal intervals in the circumferential direction are provided at the housing 2 (see FIGS. 5A and 5B). With this configuration, pressurized fluid (e.g., pressurized air) is supplied into the housing 2 through the first fluid supply holes 27 and the second fluid supply holes 28 so that the internal pressure of the housing 2 can be increased to prevent leakage of sealed fluid to the machine outer side.

Next, a structure of the segment seal 1 will be specifically described. As illustrated in FIGS. 1 and 2, the segment seal 1 mainly includes the pair of seal rings 10A, 10B, the anti-rotation member 30 interposed between the seal rings 10A, 10B, and a back plate 40 (i.e., a support member) attached to the machine outer side of the seal ring 10B. Moreover, after the segment seal 1 has been inserted through the opening 22 of the housing 2 such that the seal ring 10A, the anti-rotation member 30, the seal ring 10B, and the back plate 40 are arranged in this order, a snap ring 50 is attached to a groove formed in the vicinity of the opening 22 at the inner peripheral surface of the cylindrical portion 29 of the housing 2. In this manner, movement of the segment seal 1 in the axial direction is restricted, and detachment of the segment seal 1 from the inside of the housing 2 to the machine outer side is prevented.

The seal rings 10A, 10B are made of carbon, and are each configured such that five divided bodies 100A, 100B (see FIG. 4A and FIG. 5A) divided in the circumferential direction are assembled in an annular shape. Thus, the seal rings 10A, 10B have the same dimensions and the same shape. Note that the material of the seal rings 10A, 10B is not limited to carbon, and the seal rings 10A, 10B do not necessarily have the same dimensions and the same shape. Moreover, the seal rings 10A, 10B are biased toward the inner diameter side (i.e., a peripheral surface side of the rotary shaft 3) in such a manner that annular extension springs 12 attached to grooves 11 provided at outer peripheral surfaces of the seal rings, respectively, in the circumferential direction are tightened in the radial direction.

Further, the seal rings 10A, 10B are biased in the axial direction in such a manner that compression springs 14 each attached to 15 compression spring holes 13 (see FIGS. 4A and 5A) arranged at equal intervals in the circumferential direction are compressed in the axial direction between each of the seal rings 10A, 10B and the plate 31 of the anti-rotation member 30 interposed between the seal rings 10A, 10B.

In addition, each of the seal rings 10A, 10B is provided with a dynamic pressure groove 15 at an inner peripheral surface thereof. Each of the dynamic pressure groove 15 provided at the seal ring 10A, 10B is, as in, e.g., a Rayleigh step, configured to receive one-direction rotation of the rotary shaft 3 to generate dynamic pressure (i.e., positive pressure) between the inner peripheral surface of the seal ring 10A, 10B and a peripheral surface of the rotary shaft 3.

Moreover, five keyways 16A, 16B (i.e., recessed portions, and see FIGS. 4A and 5A) arranged at equal intervals in the circumferential direction are provided at a surface of each of the seal rings 10A, 10B facing the anti-rotation member 30 interposed between the seal rings 10A, 10B. Each of the keyway 16A, 16B is formed in such a manner that the substantially circumferential center of the divided body 100A, 100B forming the seal ring 10A, 10B is cut out in the radial direction. The keyway 16A of the seal ring 10A opens to the inner diameter side, the outer diameter side, and the machine outer side in the housing 2, and the keyway 16B of the seal ring 10B opens to the inner diameter side, the outer diameter side, and the machine inner side in the housing 2.

Figure 6:
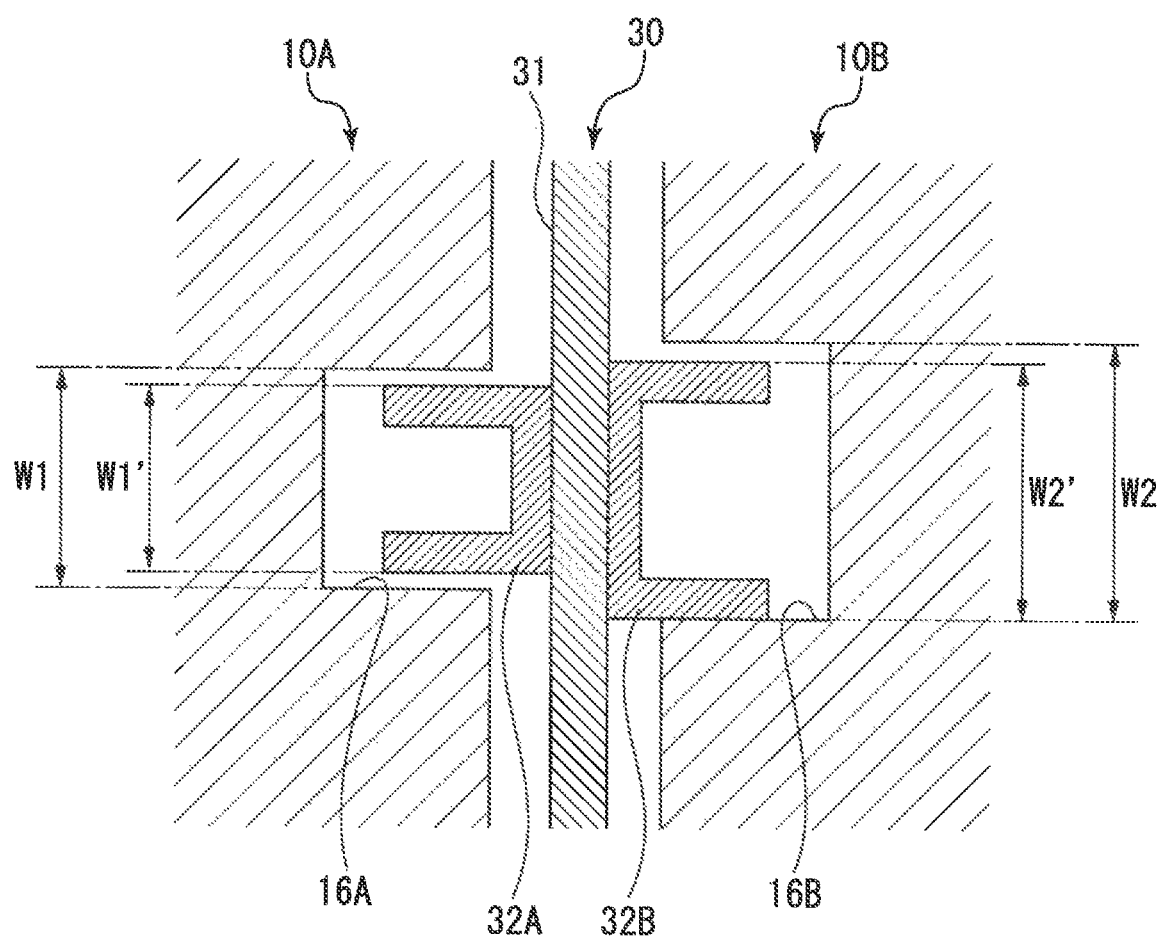
FIG. 6 is a sectional view of a fitting state of keys at both surfaces of the anti-rotation member and the keyways of the pair of seal rings in the first embodiment of the present invention.

Further, it is configured such that the width dimension W1 of the keyway 16A of the seal ring 10A in the circumferential direction is smaller than the width dimension W2 of the keyway 16B of the seal ring 10B in the circumferential direction (i.e., W1<W2, and see FIG. 6). Note that the width dimension W1 of the keyway 16A of the seal ring 10A in the circumferential direction is the substantially same as the circumferential width dimension W1 of the keyway 26 provided at the annular step portion 25 of the housing 2 as described above (see FIG. 4B).

As illustrated in FIGS. 1, 3A, and 3B, the anti-rotation member 30 includes the annular plate 31 having the substantially same diameter as that of the second annular recessed portion 24 of the cylindrical portion 29 of the housing 2 as described above, and five keys 32A, 32B (i.e., raised portions, and see FIG. 6) arranged at equal intervals in the circumferential directions at both surfaces (i.e., the machine-inner-side and machine-outer-side surfaces) of the plate 31 and having a substantially backwards C-shape as viewed in the section. Note that the plate 31 and the keys 32A, 32B are made of a metal material, and the keys 32A, 32B are arranged at the same phase in the circumferential direction at both surfaces of the plate 31 and are fixed by, e.g., welding.

Moreover, it is configured such that the width dimension W1' of the machine-inner-side (i.e., one side of front and back sides in the axial direction) key 32A of the anti-rotation member 30 is smaller than the width dimension W2' of the machine-outer-side key 32B (i.e., W1'<W2', and see FIG. 6). Note that the machine-inner-side key 32A of the anti-rotation member 30 has a shape fittable in the keyway 16A of the seal ring 10A, and the machine-outer-side key 32B has a shape fittable in the keyway 16B of the seal ring 10B.

As illustrated in FIGS. 1 and 2, the back plate 40 has a substantially L-shape as viewed in the section such that an annular protruding portion 42 of the back plate 40 extends toward the machine inner side from the outer diameter side of a machine-outer-side annular restriction portion 41 of the back plate 40, and is attached to the vicinity of the opening 22 of the housing 2 in a state in which the plate 31 of the anti-rotation member 30 is sandwiched between a machine-inner-side tip end of the annular protruding portion 42 and the annular step portion 25 of the housing 2. With this configuration, each of the back plate 40 and the above-described snap ring 50 is attached to the vicinity of the opening 22 of the housing 2 so that the anti-rotation member 30 can be held not to move in the axial direction relative to the housing 2.

Moreover, as illustrated in FIGS. 1 and 5A, five keyways 43 arranged at equal intervals in the circumferential direction are provided at the machine-inner-side tip end of the annular protruding portion 42 of the back plate 40. The keyway 43 is formed in such a manner that the machine-inner-side tip end of the annular protruding portion 42 is cut out in the radial direction, and opens to the inner diameter side, the outer diameter side, and the machine inner side in the housing 2. Note that for the sake of convenience in description, the machine-outer-side keys 32B partially forming the anti-rotation member 30 are not shown in FIG. 5A in a BB section of FIG. 1.

Further, it is configured such that the width dimension W2 of the keyway 43 in the circumferential direction is the substantially same as the width dimension W2 of the keyway 16B of the above-described seal ring 10B in the circumferential direction (see FIG. 5B).

In addition, as illustrated in FIGS. 2, 5A, and 5B, fifteen fluid supply holes 44 are provided at the annular protruding portion 42. The fluid supply holes 44 penetrate the annular protruding portion 42 to communicate, in the radial direction, with the second fluid supply holes 28 provided at the second annular recessed portion 24 of the cylindrical portion 29 of the housing 2 as described above and arranged at equal intervals in the circumferential direction.

Next, a fitting relationship among the keys and the keyways provided at the segment seal 1 and the housing 2 will be specifically described. The keys 32A, 32B of the anti-rotation member 30 are configured more elongated in the radial direction as compared to the keyways 16A, 16B of the seal rings 10A, 10B, and outer-diameter-side portions of the keys 32A, 32B of the anti-rotation member 30 protrude to the outer diameter side from the keyways 16A, 16B in a state in which the keys 32A, 32B of the anti-rotation member 30 are fitted in the keyway 16A, 16B of the seal ring 10A, 10B in the housing 2, respectively. With this configuration, the outer-diameter-side portion of the machine-inner-side key 32A of the anti-rotation member 30 is fitted in the keyway 26 provided at the annular step portion 25 of the housing 2 so that the anti-rotation member 30 can be supported not to rotate relative to the housing 2 (see FIGS. 1 and 4B). Further, the outer-diameter-side portion of the machine-outer-side key 32B of the anti-rotation member 30 is fitted in the keyway 43 provided at the tip end of the annular protruding portion 42 of the back plate 40 so that the back plate 40 can be supported not to rotate relative to the anti-rotation member 30 (see FIGS. 1 and 5B).

That is, in a state in which the seal ring 10A, the anti-rotation member 30, the seal ring 10B, and the back plate 40 of the segment seal 1 are properly inserted in this order from the opening 22 of the housing 2, the machine-inner-side keys 32A of the anti-rotation member 30 are fitted in the keyways 16A of the seal ring 10A and the keyways 26 provided at the annular step portion 25 of the housing 2, and the machine-outer-side keys 32B of the anti-rotation member 30 are fitted in the keyways 16B of the seal ring 10B and the keyways 43 of the annular protruding portion 42 of the back plate 40. In this manner, rotation of the seal rings 10A, 10B and the back plate 40 can be prevented through the anti-rotation member 30 supported not to rotate relative to the housing 2, and a seal portion can be formed between the inner peripheral surface of each of the seal rings 10A, 10B and the peripheral surface of the rotary shaft 3. With this configuration, the annular clearance between the housing 2 and the rotary shaft 3 can be sealed by the segment seal 1.

Moreover, in a state in which the seal rings 10A, 10B of the segment seal 1 are, as described above, properly arranged in the housing 2, the above-described dynamic pressure grooves 15 each provided at the inner peripheral surfaces of each of the seal rings 10A, 10B generate the dynamic pressure (the positive pressure) between the inner peripheral surface of each of the seal rings 10A, 10B and the peripheral surface of the rotary shaft 3 by one-direction rotation of the rotary shaft 3. As a result, the inner peripheral surfaces of the seal rings 10A, 10B are held in non-contact with the rotary shaft 3 rotating at high speed. Thus, abrasion of the inner peripheral surfaces of the seal rings 10A, 10B can be reduced.

Further, as illustrated in FIG. 6, it is configured such that the width dimension W1 of the keyway 16A of the seal ring 10A in the circumferential direction is smaller than the width dimension W2' of the machine-outer-side key 32B of the anti-rotation member 30 in the circumferential direction (i.e., W1<W2'). With this configuration, the machine-outer-side key 32B of the anti-rotation member 30 cannot be fitted in the keyway 16A of the seal ring 10A and the keyway 26 provided at the annular step portion 25 of the housing 2, and therefore, an error in attachment of the pair of seal rings 10A, 10B in the tandem segment seal 1 can be prevented.

Specifically, in, e.g., the tandem segment seal 1, in a case where the pair of seal rings 10A, 10B has the same shape (i.e., the keyways 16A, 16B also have the same shape) and the keys 32A, 32B of the anti-rotation member 30 have the same shape, even if the seal rings 10A, 10B are switched between the machine inner side and the machine outer side upon attachment of the segment seal 1 into the housing 2, it is difficult to notice the error in attachment of the seal rings 10A, 10B. In this case, when the dynamic pressure grooves 15 providing dynamic pressure action by one-direction rotation of the rotary shaft 3, such as the Rayleigh steps, are provided at the inner peripheral surfaces of the seal rings 10A, 10B as in the first embodiment, each of the seal rings 10A, 10B is, due to the error in attachment of the seal rings 10A, 10B, attached in a state inverted 180 degrees in the axial direction with respect to the rotary shaft 3. For this reason, there is a probability that the inner peripheral surfaces of the seal rings 10A, 10B receive the action of backward rotation of the rotary shaft 3 to generate negative pressure between the inner peripheral surface of each of the seal rings 10A, 10B and the peripheral surface of the rotary shaft 3, the inner peripheral surfaces of the seal rings 10A, 10B stick to the rotary shaft 3 rotating at high speed, and damage of the seal rings 10A, 10B is caused within a short period of time.

On the other hand, the segment seal 1 of the first embodiment is configured such that the width dimension W1 of the keyway 16A of the seal ring 10A in the circumferential direction is smaller than the width dimension W2' of the machine-outer-side key 32B of the anti-rotation member 30 in the circumferential direction. Thus, when the segment seal 1 is attached to the inside of the housing 2, even if the seal ring 10B is first erroneously inserted into the housing 2, the machine-outer-side keys 32B of the anti-rotation member 30 cannot fitted in the keyways 16A of the seal ring 10A at such a stage that the seal ring 10A is inserted after the anti-rotation member 30 in a state in which the keys 32A face the machine inner side has been inserted. Thus, the error in attachment of the seal rings 10A, 10B can be noticed.

Moreover, when the segment seal 1 is attached to the inside of the housing 2, even if the seal ring 10B is erroneously inserted through the opening 22 of the housing 2 and is arranged on the machine inner side after an unit has been formed in such a manner that the keyways 16A, 16B of the seal rings 10A, 10B and the keys 32A, 32B of the anti-rotation member 30 are properly fitted to each other in advance on the machine outer side, the anti-rotation member 30 is inserted with the keys 32B facing the machine inner side, and therefore, the keys 32B of the anti-rotation member 30 cannot be fitted in the keyways 26 provided at the annular step portion 25 of the housing 2. Thus, the error in attachment of the seal rings 10A, 10B can be noticed.

As described above, in the segment seal 1, rotation of the seal rings 10A, 10B relative to the housing 2 can be prevented by fitting of the keys 32A, 32B of the anti-rotation member 30 interposed between the seal rings 10A, 10B and having different fitting shapes and the keyways 16A, 16B of the seal rings 10A, 10B. Moreover, fitting in the keyways 26 of the annular step portion 25 of the housing 2 for preventing rotation of the anti-rotation member 30 relative to the housing 2 is allowed only on one side on which the keys 32A of the anti-rotation member 30 are provided. Thus, in a state in which the direction of attachment of the anti-rotation member 30 to the housing 2 is defined and the order of inserting the seal rings 10A, 10B each inserted into the machine inner side (i.e., an annular restriction portion 20 side) and the machine outer side (a back plate 40 side) in the housing 2 is wrong, key fitting of the anti-rotation member 30 and the housing 2 or key fitting of the anti-rotation member 30 and the seal rings 10A, 10B cannot be performed. Thus, the error in attachment of the pair of seal rings 10A, 10B in the tandem segment seal 1 can be prevented.

Moreover, the machine-inner-side key 32A of the anti-rotation member 30 is configured as a member continuously and radially extending in the radial direction. Thus, the positions of the keyways 16A of the seal ring 10A and the positions of the keyways 26 of the annular step portion 25 of the housing 2 are adjusted in the circumferential direction in advance, and in this manner, the machine-inner-side keys 32A of the anti-rotation member 30 can be fitted in the keyways 16A of the seal ring 10A and the keyways 26 of the annular step portion 25 of the housing 2 at once. Thus, workability in attachment of the segment seal 1 can be enhanced.

Further, the substantially same shape of fitting of the keyway 16A of the seal ring 10A and the keyway 26 of the annular step portion 25 of the housing 2 with respect to the machine-inner-side key 32A of the anti-rotation member 30 is employed. Thus, it is not necessary to change the shape of the key 32A provided at the anti-rotation member 30 according to the shape of the keyway 16A of the seal ring 10A and the shape of the keyway 26 of the annular step portion 25 of the housing 2, and the machine-inner-side key 32A of the anti-rotation member 30 can be easily created.

In addition, the keys 32A, 32B of the anti-rotation member 30 are arranged with the same phase in the circumferential direction at both surfaces of the plate 31. Thus, when the keys 32A, 32B of the anti-rotation member 30 and the keyways 16A, 16B of the pair of seal rings 10A, 10B are fitted to each other, such fitting can be easily performed without position adjustment in the circumferential direction, and the workability in attachment of the segment seal 1 can be enhanced.

Moreover, the keys 32A, 32B of the anti-rotation member 30 are arranged with the same phase in the circumferential direction at both surfaces of the plate 31. Thus, when the keys 32A, 32B are attached to the plate 31, these keys can be simultaneously attached by, e.g., welding, and the anti-rotation member 30 can be easily created. Note that in the case of attaching the keys 32A, 32B to the plate 31 by welding, the plate 31 becomes easily deformable due to heat. In the case of arranging the keys 32A, 32B of the anti-rotation member 30 with different phases in the circumferential direction at both surfaces of the plate 31, a peripheral surface of the plate 31 is in a corrugated shape, and therefore, there is a probability that fitting in, e.g., the keyways 16A, 16B of the seal rings 10A, 10B cannot be made. On the other hand, the anti-rotation member 30 of the first embodiment is configured so that the keys 32A, 32B can be welded to both surfaces of the plate 31 with the same phase in the circumferential direction, and therefore, welded portions can be reduced to minimum and deformation of the plate 31 can be reduced.

Further, the keys 32A, 32B of the anti-rotation member 30 are configured such that the machine-inner-side key 32A has a smaller width dimension in the circumferential direction than that of the machine-outer-side key 32B (i.e., W1'<W2', and see FIG. 6). Thus, in the case of inserting the anti-rotation member 30 through the opening 22 of the housing 2 with the machine-outer-side keys 32B facing the machine inner side, fitting in the keyways 26 of the annular step portion 25 of the housing 2 is not allowed, and therefore, an assembly error can be noticed at an early stage before insertion of the seal ring 10B.

In addition, the keyways 43 in which the machine-outer-side keys 32B of the anti-rotation member 30 are to be fitted are provided at the back plate 40. Thus, the machine-outer-side keys 32B of the anti-rotation member 30 for preventing rotation of the seal ring 10B relative to the housing 2 can be shared, and rotation of the back plate 40 can be prevented such that idling does not occur in response to rotation of the rotary shaft 3. Thus, the structure of the segment seal 1 can be simplified.

Moreover, the keyways 16A, 16B are provided at the substantially center of the divided bodies 100A, 100B, respectively, in the circumferential direction, the divided body 100A, 100B forming the seal ring 10A, 10B. Thus, in a state in which the keys 32A, 32B of the anti-rotation member 30 are fitted, force acts on the seal rings 10A, 10B (or each of the divided bodies 100A, 100B) with favorable balance.

Further, the seal rings 10A, 10B have the substantially same shape, except for the keyways 16A, 16B. Thus, the abrasion amounts of the seal rings 10A, 10B due to use of the segment seal 1 can be at the same level, and replacement of the seal rings 10A, 10B can be performed at the same timing.

In addition, the plate 31 of the anti-rotation member 30 is formed in the annular shape having the substantially same diameter as that of the second annular recessed portion 24 of the cylindrical portion 29 of the housing 2. Thus, the plate 31 substantially contacts the annular step portion 25 of the housing 2 and the inner peripheral surface of the cylindrical portion 29 of the housing 2 so that a clearance in the axial direction in the housing 2 can be closed on the outer diameter side with respect to the seal rings 10A, 10B. Leakage of fluid in the axial direction in a stop state of the rotary shaft 3 can be reduced.

Second Embodiment

A segment seal according to a second embodiment of the present invention will be described with reference to FIGS. 7A and 7B. Note that the same reference numerals are used to represent the same components as those described in the above-described embodiment, and overlapping description will be omitted.

Figure 7:
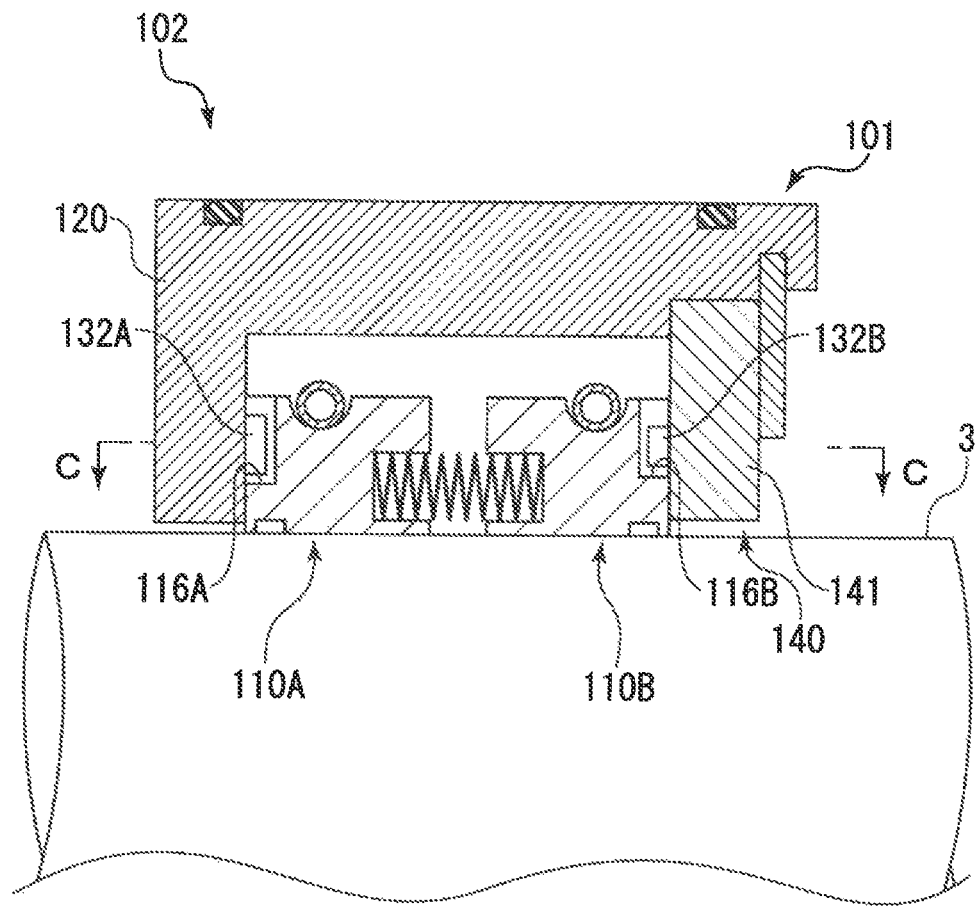
FIG. 7A illustrates an attachment state of a segment seal in a second embodiment of the present invention and is a sectional view cut toward a shaft center along a plane including keyways.
FIG. 7B is a sectional view of a fitting state of a key of an anti-rotation member and a keyway in the second embodiment of the present invention in a CC section of FIG. 7A.
Figure 7:
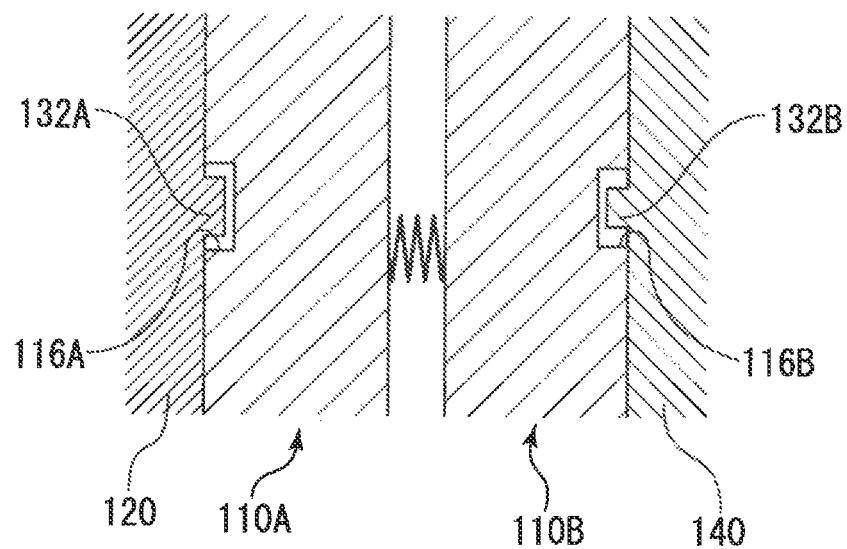

As illustrated in FIG. 7A, a segment seal 101 of a second embodiment is configured as a so-called tandem segment seal configured such that a pair of seal rings 110A, 110B are arranged in an axial direction in an annular clearance between a housing 102 and a rotary shaft 3. Note that regarding the pair of seal rings 110A, 110B partially forming the segment seal 101, one arranged on a machine inner side will be described as the seal ring 110A, and one arranged on a machine outer side will be described as the seal ring 110B.

On the machine inner side of the seal ring 110A, multiple keyways 116A (i.e., recessed portions of the anti-rotation member) arranged at equal intervals in a circumferential direction are provided at a surface facing an annular restriction portion 120 of the housing 102. On the machine outer side of the seal ring 110B, multiple keyways 116B (i.e., recessed portions of the anti-rotation members) arranged at equal intervals in the circumferential direction are provided at a surface facing an annular restriction portion 141 of a back plate 140 (i.e., a support member).

At the annular restriction portion 120 of the housing 102, multiple keys 132A (i.e., raised portions of the anti-rotation members) arranged at equal intervals in the circumferential direction are provided at a surface facing the machine inner side of the seal ring 110A. At the annular restriction portion 141 of the back plate 140 (i.e., the support member), multiple keys 132B (i.e., raised portions of the anti-rotation members) arranged at equal intervals in the circumferential direction are provided at a surface facing the seal ring 110B. Note that in the present embodiment, the keys 132A and the keys 132B are provided integrally with the housing 102 and the back plate 140, but the keys 132A and the keys 132B provided separately may be fixed not to rotate relative to the annular restriction portion 120 of the housing 102 and the annular restriction portion 141 of the back plate 140.

As illustrated in FIG. 7B, it is configured such that the circumferential width dimension of the key 132A provided at the annular restriction portion 120 of the housing 102 is smaller than the circumferential width dimension of the key 132B provided at the annular restriction portion 141 of the back plate 140. The key 132A provided at the annular restriction portion 120 of the housing 102 has a shape fittable in the keyway 116A provided on the machine inner side of the seal ring 110A, and the key 132B provided at the annular restriction portion 141 of the back plate 140 has a shape fittable in the keyway 116B provided on the machine outer side of the seal ring 110B.

With this configuration, the segment seal 101 of the second embodiment includes, as the anti-rotation members, the keys 132A, 132B placed not to rotate relative to the housing 102 or the back plate 140, formed fittable in the pair of seal rings 110A, 110B to prevent rotation of the pair of seal rings 110A, 110B, and configured such that at least ones of the keys 132A, 132B are fitted only in the keyways 116A, 116B provided at either one of the pair of seal rings 110A, 110B. The direction of attachment of the pair of seal rings 110A, 110B to the keys 132A, 132B is defined. Thus, in a state in which the order of inserting the seal rings 110A, 110B each inserted into an annular restriction portion 120 side and a back plate 140 side of the housing 102 is wrong, fitting of the keyways 116A, 116B of the seal rings 110A, 110B and the keys 132A, 132B cannot be made. Thus, an error in attachment of the pair of seal rings 110A, 110B in the tandem segment seal can be prevented.

The embodiments of the present invention have been described above with reference to the drawings, but specific configurations are not limited to these embodiments. The present invention also includes changes and additions made without departing from the gist of the present invention.

For example, in the above-described embodiments, it has been described that the seal ring has such a structure that five divided bodies divided in the circumferential direction are combined, but the present invention is not limited to above. The number of divided bodies forming the seal ring may be freely set.

Moreover, the above-described embodiments have described the configuration in which five keys 32A, 32B of the anti-rotation member 30, five keyways 16A, 16B of the seal ring 10A, 10B, five keyways 26 of the annular step portion 25 of the housing 2, and five keyways 43 of the back plate 40 are arranged at equal intervals in the circumferential direction, but the present invention is not limited to above. The numbers of keys and keyways provided at each member may be freely set. Further, the numbers of keys and keyways fittable to each other on the machine inner side and the machine outer side with respect to the anti-rotation member may be different from each other.

Further, the above-described embodiments have described the configuration in which the keys 32A, 32B of the anti-rotation member 30 are arranged with the same phase in the circumferential direction, but the present invention is not limited to above. The keys provided at both surfaces of the anti-rotation member 30 may be arranged with different phases.

In addition, the above-described embodiments have described that the keys 32A, 32B are fixed to the plate 31 of the anti-rotation member 30 by, e.g., welding, but the keys may be configured integrally with the plate at the anti-rotation member.

Moreover, the above-described embodiments have described that the key 32A, 32B of the anti-rotation member 30 is a member having a substantially backwards C-shape as viewed in the section, but the present invention is not limited to above. The shape of the key may be freely set, and may be a substantially rectangular shape or a substantially triangular shape as viewed in the section, for example.

Further, the above-described embodiments have described the form in which a fitting shape difference is provided by a difference in the width dimensions of the keys and the keyways in the circumferential direction in the segment seal 1, 101, but the present invention is not limited to above. The fitting shapes of the keys and the keyways in the segment seal may allow, even when the substantially same width dimensions in the circumferential direction are employed, specific fitting of each key in the pair of seal rings due to a shape difference.

In addition, the above-described embodiments have described that the keys 32A, 32B of the anti-rotation member 30 are elongated in the radial direction to protrude to the outer diameter side from the seal rings 10A, 10B in a state in which the keys 32A, 32B are each fitted in the keyways 16A, 16B of the seal rings 10A, 10B, but the present invention is not limited to above. The key of the anti-rotation member may be configured shorter in the radial direction than the keyway of the seal ring. In this case, at least the machine-inner-side keys 32A may be fitted in the keyways 16A of the seal ring 10A and the keyways 26 of the annular step portion 25 of the housing 2. Further, as long as the machine-outer-side keys 32B are fitted in the keyways 16B of the seal ring 10B, the outer-diameter-side portions to be fitted in the keyways 43 of the annular protruding portion 42 of the back plate 40 are not necessarily provided.

Moreover, the above-described embodiments have described the keys 32A, 32B of the anti-rotation member 30 as the members continuously and radially extending in the radial direction, but the present invention is not limited to above. The key of the anti-rotation member does not necessarily extend continuously and radially in the radial direction. For example, the inner-diameter-side portions fittable in the keyways of the seal ring and the outer-diameter-side portions fittable in the keyways of the annular step portion of the housing and the keyways of the annular protruding portion of the back plate may be provided separately, and may be separated from each other in the radial direction.

Further, the above-described embodiments have described the configuration in which the machine-inner-side keys 32A of the anti-rotation member 30 are fitted in the keyways 26 of the annular step portion 25 of the housing 2, but the present invention is not limited to above. The keyways may be provided at the plate of the anti-rotation member such that the keys provided at the annular step portion of the housing are fitted in such keyways.

In addition, the above-described embodiments have described the form in which the machine-outer-side keys 32B of the anti-rotation member 30 are configured such that the outer-diameter-side portions thereof are fitted in the keyways 43 provided at the tip end of the annular protruding portion 42 of the back plate 40, but the present invention is not limited to above. The keyway in which the outer-diameter-portion of the machine-outer-side is fitted may be provided at the cylindrical portion of the housing. In this case, the shape of the plate of the anti-rotation member is preferably formed according to the inner peripheral shape of the cylindrical portion (i.e., the second annular recessed portion) provided with the keyways so that the plate can be inserted to the position of the annular step portion of the housing. The raised portions fittable in the keyways are preferably provided at the tip end of the annular protruding portion of the back plate such that the back plate is supported not to rotate relative to the housing.

Moreover, the above-described embodiments have described that the housing 2, 102 are configured such that the cylindrical portion 29 and the annular restriction portion 20, 120 are integrated, but the housing may be configured such that the cylindrical portion and the annular restriction portion are provided separately, and the annular restriction portion is fixed to the cylindrical portion with, e.g., a screw.

Further, the plate provided between the pair of seal rings in the segment seal 1 of the above-described first embodiment may be provided in the segment seal 101 of the above-described second embodiment. Moreover, the fluid supply holes formed at the housing and the back plate in the segment seal 1 of the above-described first embodiment may be provided in the segment seal 101 of the above-described second embodiment.

In addition, the rotary shaft may include a shaft body and a runner attached to the outer periphery of the shaft body to protect the shaft body.

REFERENCE SIGNS LIST

1, 101 Segment seal
2 Housing
3 Rotary shaft
10A, 10B Seal ring
15 Dynamic pressure groove
16A, 16B Keyway (Recessed portion)
20 Annular restriction portion (One end portion)
22 Opening
23 First annular recessed portion
24 Second annular recessed portion
25 Annular step portion
26 Keyway
30 Anti-rotation member
31 Plate
32A, 32B Key (Raised portion)
40 Back plate (Support member)
43 Keyway
50 Snap ring
102 Housing
110A, 110B Seal ring
116A, 116B Keyway (Recessed portion of Anti-rotation member)
120 Annular restriction portion
132A, 132B Key (Raised portion of Anti-rotation member)
140 Back plate (Support member)
141 Annular restriction portion

The invention claimed is:

1. A segment seal for sealing an annular clearance between a housing and a rotary shaft in a state in which a pair of seal rings is attached in an unrotatable state between one end portion of the housing and a support member attached to the housing so as to be opposite to the one of end portion in an axial direction, comprising:

an anti-rotation member placed not to rotate relative to the housing or the support member, provided with a pair of raised portions or a pair of recessed portions fitted to the pair of seal rings, respectively, to prevent rotation of the pair of seal rings, and configured such that at least one of the raised portions or at least one of the recessed portions has a shape fittable only to either one of the seal rings, wherein the anti-rotation member is interposed between the pair of seal rings, and comprises an annular plate and a pair of keys protruding from both surfaces of the annular plate and having different shapes, respectively, the housing is provided with a keyway having one of the keys fitted therein, and the keyway of the housing has a shape fittable only to either one of the keys of the anti-rotation member.

2. The segment seal according to claim 1, wherein each of the raised portions is formed by part of each of the keys.

3. The segment seal according to claim 2, wherein the keys are arranged with a same phase in a circumferential direction on both surfaces of the annular plate.

4. The segment seal according to claim 2, wherein one of the keys on a side of the one end portion of the housing is smaller than one of the keys on a side of the support member.

5. The segment seal according to claim 2, wherein the support member has a keyway in which one of the keys of the anti-rotation member protruding toward the support member is fitted.

6. The segment seal according to claim 1, wherein the keys are arranged with a same phase in a circumferential direction on both surfaces of the annular plate.

7. The segment seal according to claim 6, wherein one of the keys on a side of the one end portion of the housing is smaller than one of the keys on a side of the support member.

8. The segment seal according to claim 6, wherein the support member has a keyway in which one of the keys of the anti-rotation member protruding toward the support member is fitted.

9. The segment seal according to claim 1, wherein one of the keys on a side of the one end portion of the housing is smaller than one of the keys on a side of the support member.

10. The segment seal according to claim 9, wherein the support member has a keyway in which one of the keys of the anti-rotation member protruding toward the support member is fitted.

11. The segment seal according to claim 1, wherein the support member has a keyway in which one of the keys of the anti-rotation member protruding toward the support member is fitted.

\* \* \* \* \*